United States Patent [19]

Mase

[11] Patent Number: 4,833,547
[45] Date of Patent: May 23, 1989

[54] PORTABLE FACSIMILE EQUIPMENT AND THE COVER BODY CLOSING DEVICE

[75] Inventor: Osamu Mase, Hamamatsu, Japan

[73] Assignee: Nissei Opto Co., Ltd., Hamamatsu, Japan

[21] Appl. No.: 182,084

[22] Filed: Apr. 15, 1988

[30] Foreign Application Priority Data

Apr. 20, 1987 [JP] Japan ................................ 62-96894
Apr. 20, 1987 [JP] Japan ................................ 62-59783

[51] Int. Cl.⁴ .................... H04N 1/23; H04N 1/00; E05C 3/02
[52] U.S. Cl. ............................ 358/296; 358/256; 292/124; 292/240; 292/127
[58] Field of Search ............... 358/256, 285, 286, 293, 358/294, 296; 346/76 PH; 292/124, 127, DIG. 37, 240

[56] References Cited

U.S. PATENT DOCUMENTS

| 1,650,805 | 11/1927 | Schnoor | 292/127 |
| 2,880,452 | 4/1959 | Forgach | 292/127 |
| 4,562,444 | 12/1985 | Nagashima | 346/76 PH |
| 4,754,337 | 6/1988 | Nohtomi | 358/286 |

FOREIGN PATENT DOCUMENTS

| 666885 | 2/1952 | United Kingdom . |
| 765006 | 1/1957 | United Kingdom . |
| 2121359 | 5/1983 | United Kingdom . |
| 2125098 | 2/1984 | United Kingdom . |
| 2183959 | 10/1986 | United Kingdom . |

Primary Examiner—E. A. Goldberg
Assistant Examiner—Scott A. Rogers
Attorney, Agent, or Firm—Birch, Stewart, Kolasch & Birch

[57] ABSTRACT

In an portable facsimile equipment comprising a cover body and a main body: the cover body having a reading head and a printing head is pivotally connected to the main body having a reading roller, a printing roller, a roll body and respective driving unit.

And a cover body closing device for use in above portable facsimile equipment comprises a lock piece, a lock pin, urging unit, locking unit and an unlocking unit.

19 Claims, 8 Drawing Sheets

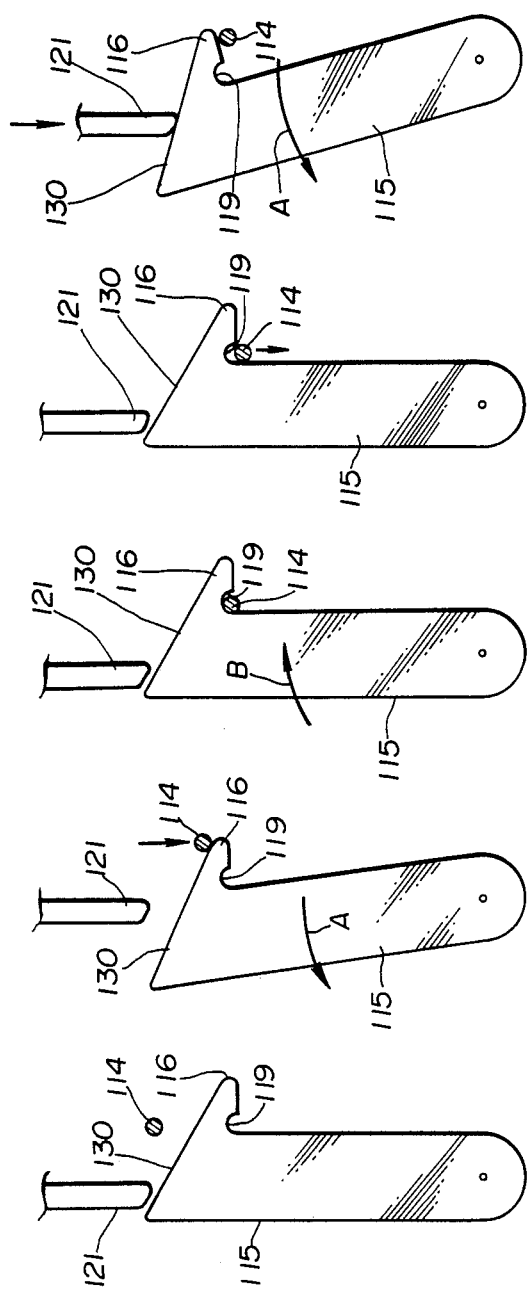

PORTABLE FACSIMILE EQUIPMENT AND THE COVER BODY CLOSING DEVICE

BACKGROUND OF THE INVENTION

This invention relates to a portable facsimile equipment which is easy to carry and a cover body closing device for use in the portable facsimile equipment.

The portable facsimile equipment is the indoor facsimile equipment which is miniaturized and has a weight reduced. One example of the portable facsimile equipments is shown in FIG. 8. The portable facsimile equipment has a main body 1 provided with a handle 3 formed integrally therewith, and a cover body 2 connected to the main body 1 openably. The portable facsimile equipment comprises a reading head and a reading roller for reading and guiding an original, a printing roller and a printing head for printing received signals on recording paper and guiding out the recording paper printed, and a roll for supplying recording paper continuously. Such mechanical basic structure of the portable facsimile equipment is substantially the same as the indoor facsimile equipment.

A locking mechanism is provided for keeping the cover body 2 and the main body 1 inengagement with each other. FIG. 8 reference numeral 110 indicates an unlocking button. The unlocking button 110 is directly or indirectly interlocked with the locking mechanism to unlock the locking mechanism. When the unlocking button 110 is pressed down, the cover body 2 swings in its opening direction.

Rotary members, such as the reading roller and the printing roller, and the driving means for rotating the rotary members are disposed on the inside of the cover body 2.

This causes a disadvantage that the structure of the cover body 2 becomes complicated, and it is difficult and bothering to clean the cover body 2. In addition, impacts, vibrations, etc. caused when the cover body is opened and closed affect the driving means, which result in additional disadvantages that malfunctions are caused frequently, and that screws unfasten, welds cracking, which cause the members to rattle. Besides, the complicated structure of the cover body makes the facsimile equipment bulky to handle.

It occurs in such portable facsimile equipment that the cover body 2 opens unintentionally to expose the interior of the main body 1 to the exterior, the roll body 11 and other auxiliaries, an original held between the main body 1 and the cover body 2 dropping outside. This occurrence takes place when such portable facsimile equipment and instruments hit passengers or things placed outside while being carried, and an impact which acts to them unlocks the locking mechanism resultantly to open the cover body 2.

SUMMARY OF THE INVENTION

In view of these disadvantages, this invention aims at providing a portable facsimile equipment which can be readily cleaned, rarely malfunctions and becomes rattling.

In view of such undesirable occurrence, this invention aims at proving a cover body closing device for use in the portable facsimile equipment, which is preventive of unintentional opening of the cover body.

The portable facsimile equipment according to a first aspect of this invention is characterized in that rotary members, such as a reading roller and a printing roller, etc., and the driving means for rotating the rotary members are disposed only on a main body, while non rotary members, such as a reading head, a printing head, are disposed on a cover body.

The portable facsimile equipment according to a second aspect of this invention is not only characterized by the feature according to the first aspect, but also characterized in that the outlets for an original and recording paper recorded are openings defined between the main body and the cover body.

The cover body closing device for use in the portable facsimile equipment and instruments is provided between the main body and the cover body having one end pivotally connected to the main body swingably in its opening direction and comprises a lock pin and a lock piece which engage with each other; locking means for using the engagement between the two to lock the cover body in its closed condition; unlocking means for swinging the lock piece in the direction of disengagement from the lock pin; and an engagement recess formed in the lock piece into which the lock pin engages and from which the lock pin is caused to disengage by a pressing down force applied to the cover body in its locked condition.

BRIEF DESCRIPTION OF THE DRAWINGS

FIGS. 6A-6E are side views of the cover body closing device of FIG. 5 in operation;

DETAILED DESCRIPTION OF THE INVENTION

Figure 1:
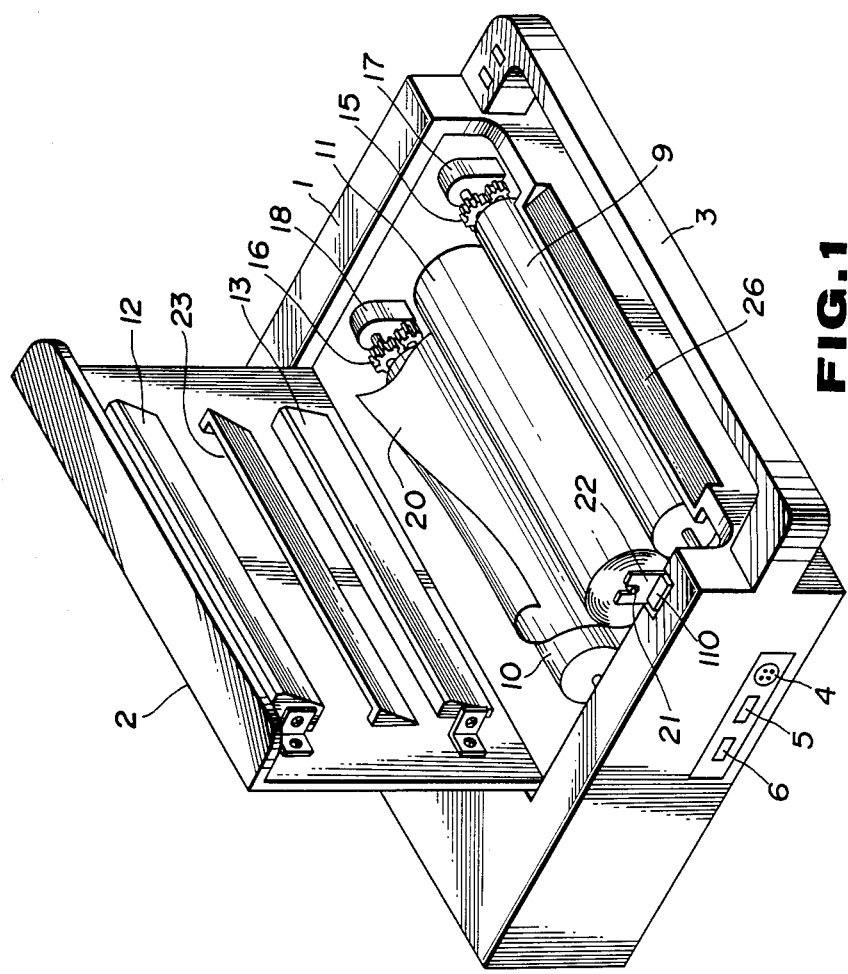
FIG. 1 is a perspective view of one embodiment of the portable facsimile equipment in its opened condition, according to the first and the second aspects of this invention.
Figure 2:
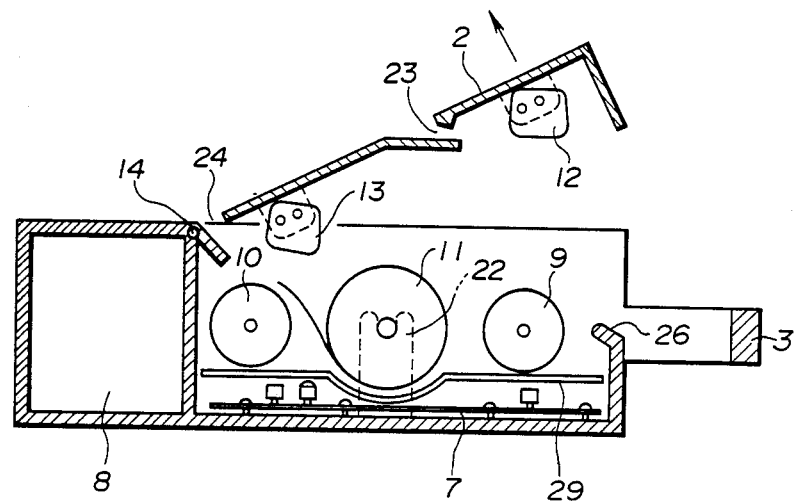
FIG. 2 is a sectional view of the facsimile equipment of FIG. 1.
Figure 4:
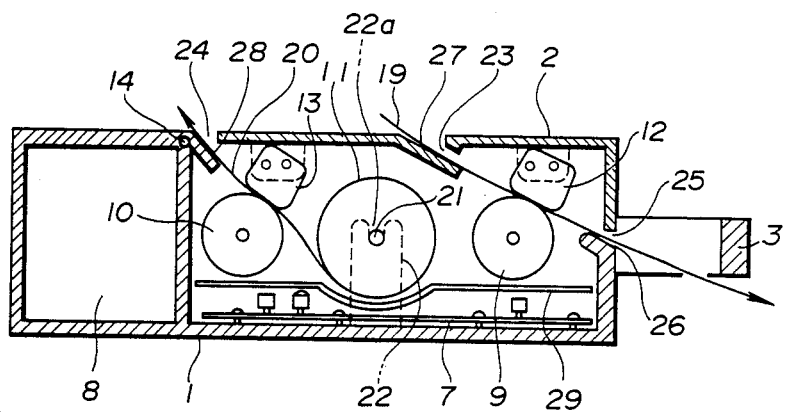
FIG. 4 is a sectional view of FIG. 3.

As shown in FIGS. 1-4, the cover body 2 is attached openably on a main body 1 in the shape of a box. A handle 3 in the shape of a bracket is provided on the outside of one end of the main body 1 integrally therewith. On one of the sides perpendicular to the end on which the handle 3 is provided there are provided a telephone wire plug 4 to which a telephone wire (not shown) is connected, an acoustic coupler plug 5 to which an acoustic coupler (not shown) is connected, and a power terminal 6 to be connected to a power source. A printed board 7 connected to the telephone plug 4 and the acoustic coupler plug 5 is attached to the inside bottom of the main body 1 by, e.g., screws, and on one inside end of the main body 1 is formed a partitioned chamber 8 for housing a power source unit (not shown).

There are provided a reading roller 9 and a printing roller 10 rotatably in the space within the main body 1. A roll body 11 is provided between the reading roller 9 and the printing roller 10. The reading roller 9 is positioned in a space on the side of the handle 3 in an opposing relationship with a reading head 12 which will be described below. The printing roller 10 is positioned in a space of the main body 1 on the side of a pivot pin 14 of the cover body in an opposing relationship with a printing head 13. The shafts of the rollers 9, 10 are connected to the respective output shafts of their driving means 17, 18 through, e.g., respective gear devices 15, 16. When the reading roller 9 rotates, an original 19 is guided, and when the printing roller 10 rotates, a recording paper 20 is guided.

The roll body 11 comprises an axial core 21, and a recording paper 20 wound thereon. The axial core 21 is supported rotatably on a bracket 22 in the recess 22a formed in the upper end thereof. The roll body 11 can be replaced simply by putting the roll body 11 in or out of the recess 22a, and advantageously the work is very easy.

A cover body 2 is connected at one end to the main body 1 by means of the pivot pin 14, and the end of the cover body 2 on the side of the handle 3 is openable. The reading head 12 is positioned on the inside of the cover body 2 on the side of the handle 3, and the printing head 13 is positioned thereon on the side of the pivot pin 14. The reading head 12 optically reads the original 19 and is arranged so that the original 19 may be guided between the reading head 12 and the reading roller 9. The printing head 13 prints the received signals on the recording paper 20 and is arranged so that the recording paper 20 supplied from the roll body 11 may be guided between the printing head 13 and the printing roller 10.

An original inlet 23 into which the original 19 is inserted is formed in the cover body 2 on the side of the handle 3. A recorded paper outlet 24 from which the recorded portion of the recording paper 20 supplied by the roll body 11 is guided out is formed in the cover body 2 on the side of the pivot pin 14. The cover body 2 has the end on the side of the handle 3 bent down to abut on the end surface of the main body 1. The opening 25 is formed in the abutting portion. The opening 25 is positioned in a communicative relationship with the original inlet 23 so that the original 19 which has been charged in the inlet 23 and passed between the reading head 12 and the reading roller 9, may be discharged through the opening 25 as an original outlet.

In this embodiment, the opening 25 is formed substantially at the center of the transverse length of the handle 3. A guide surface 26 declined toward the side of the handle 3 is formed on the end surface of the main body 1 below the opening 25. The original 19 discharged through the opening 25 moves out along the guide surface 26 and then slides along the underside of the handle 3. The handle 3 serves also as a guide for the original 19 and assists the smooth discharge of the original 19. Thus, advantageously the original outlet can be formed easily by making use of the opening 25 between the main body 1 and the cover body 2, and the equipment can be formed easily. Guide surfaces 27, 28 which have the same function as the guide surface 26 are provided on the original inlet 23 and the recording paper outlet 24.

Figure 3:
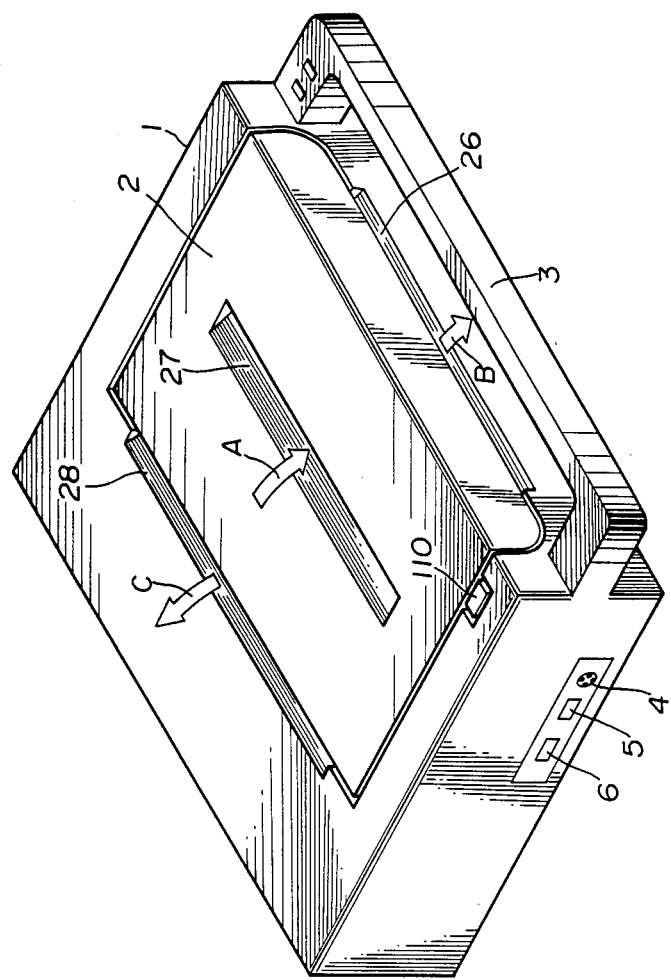
FIG. 3 is a perspective view of one embodiment of the portable facsimile equipment in use, according to the first and the second aspects of this invention.

In FIGS. 1 and 3, reference numeral 110 indicates button provided on the main body 1. When the cover body 2 is opened, the button 110 is pressed down, and the cover body 2 is opened. The details of the cover body closing device will be described later.

In this embodiment, the reading roller 9 and the printing roller 10, which are rotatable, and the driving means 17, 18 for rotating the reading roller 9 and the printing roller 10 are disposed in the main body 1 and are rarely affected by the impacts and vibrations caused when the cover body 2 is opened and closed. This makes their malfunctions much less frequent. On the cover body 2, only the reading head 12 and the printing head 13 are disposed. This simplifies the structure of the cover body 1, and the cover body 1 can be cleaned easily. Besides, the original 19 and the recording paper 20 can be supplied easily.

Next, the operation of the portable facsimile equipment according to the above mentioned embodiment will be explained. In the transmission, the reading roller 19 rotates, and the original 19 is inserted into the original inlet 23 in the direction of the arrow A in FIG. 3. The original 19 passes between the reading roller 9 and the reading head 12 to be guided out from the original outlet 25 and slides along the underside of the handle 3 in the direction of the arrow B in FIG. 3. Thus the original 19 is discharged without colliding the handle 3 or a table.

A transparent glass sheet (not shown), for example, is fixed to the front of the reading head 12 opposed to the reading roller 9 to provide a smooth surface. This enables the original 19 to be guided smoothly even without the provision of rotatable rollers, or the like on the cover body 2. The original inlet 23 and the original outlet 25 are positioned at one corner thereof so that the original 19 may pass through the facsimile equipment diagonally. This allows the original to be guided linearly, and the movement of the original is smooth.

In the reception, the printing roller 10 rotates, and the recording paper 20 is supplied from the roll body 11. The recording paper 20 passes between the printing roller 10 and the printing head 13 and then discharged in the direction of the arrow C in FIG. 3. The recording paper 20 is supplied from below the roll body 11. Even when dust is accumulated on the surface of the roll body 11, the side of the recording paper 20 to be printed does not contact to the dusty surface of the roll body 11, and the front of the printing head 13 (e.g., the front of the glass sheet fixed to the front of the printing head 13) is not polluted.

The recording paper 20 is guided out between the printing roller 10 and the opposed smooth front of the printing head 13, and thus even without the provision of a driving mechanism, rotatable roller or the like on the cover body 2, the recording paper can be discharged smoothly. Since the roll body 11 is supported on the bracket 22, it is kept stable in position even when the roll body 11 has reduced its diameter. A partitioning plate 29 is provided below the roll body 11 to keep the printed board 8 disposed therebelow from being affected by dust, etc.

Next, the cover body device for use in the portable facsimile as shown in FIGS. 1 to 4 will be explained.

Figure 5:
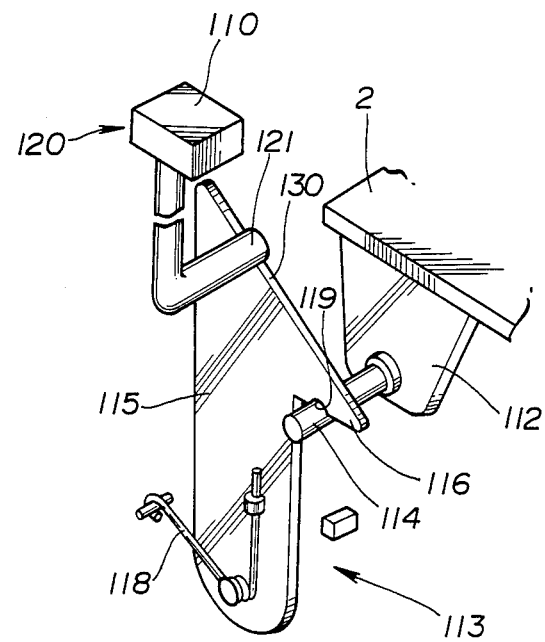
FIG. 5 is a perspective view of a pertinent portion of the cover body closing device of above portable facsimile equipment.

As shown in FIG. 5, a bracket 112 is provided on the inside of the cover body 2. The locking mechanism 113 is provided between the bracket 112 and the main body. The locking mechanism 113 comprises a lock pin 114 projected from the bracket 112 outward (sidewise of the cover body 2), and a lock piece 115 attached to the main body swingably. The lock piece 115 contains a lock pawl 116 for the lock pin 114 to engage into, and a inclined surface 130 which is declined downward.

A return spring 118 has one end wound on the lock piece 115 and the other end wound on the main body, so that the lock piece 115 is urged swingably in the direction of engagement of the lock piece 115 with the lock pin 114. In the forward of the direction in which the lock piece 115 is urged, a stopper 131 limiting the amount of rotation for a lock piece 115 is fixed on the main body 1. The lock pawl 116 has a semi arcuate engagement recess 119 opening downward. Since the lock pawl 116 of the lock piece 115 has the engagement recess 119, when the lock pin 114 engages into the lock pawl 116, the lock pin 114 fits into the recess 119. This prevents the unintentional unlocking which will be described below.

An unlocking lever 121 of unlocking means 120 is in contact with the upper part of the inclined surface 130, and when the unlocking lever 121 is moved downward, the lock piece 115 is swing in the direction opposite to that of urging of the return spring 118. The unlocking lever 121 is connected directly or indirectly to the unlocking button 110 so that when the button 110 is pressed down, the unlocking lever 121 may be moved down. The lower part of the inclined surface 130 guides the lock pin 114 into engagement with the lock pawl 116.

Next, the operation of the first embodiment described above will be explained with reference to FIGS. 6A, 6B, 6C, 6D and 6E.

When the cover body 2 is opened, the lock pin 114 is out of engagement with the lock pawl 116 (FIG. 6A). When the cover body 2 is closed, the lock pin 114 goes down to come into contact with the lower part of the inclined surface 130 of the lock piece 115, and the lock pin 114 presses down the inclined surface 130. Then the inclined surface 130 is caused to slide along the underside of the lock pin 114, and the lock piece 115 swings in the direction of the arrow A (FIG. 6B).

When the lock pin 114 reaches the lower end of the inclined surface 130, and the inclined surface 130 comes off the lock pin 114, the inclined surface 130 is released from the pressing force of the lock pin 114, and the lock piece 115 is swung by the urging force of the return spring 118 in the direction of the arrow B. Then the lock pin 114 and the lock pawl 116 come into engagement with each other. In this engagement, because of the engagement recess 119 in the lock pawl 116 and the urging of the lock piece 115 acting in the direction of the arrow B, the lock pin 114 comes into engagement in the recess 119 (FIG. 6C). Now the locking mechanism is locked with the cover body 2 closed.

Such locked condition is retained not only by the lock piece 115 being urged by the return spring 118 in the direction of engagement with the lock pin 114, but also by the mechanism of the lock pin 114 being inserted in the recess 119. This engaging condition prevents the disengagement of the lock pin 114 from the recee 119 even when a shock caused by a collision or the like acts to the unlocking button 110, and the unintentional opening of the cover body 2 is prevented. Besides, even when the unlocking button is lightly pressed down, moving down the unlocking lever 121, the force caused by the downward movement does not act in the direction of disengagement between the lock pin 114 and the recess 119, so that the lock pin 114 is not unlocked from the recess 119. Thus, when the unlocking button is unintentionally pressed down, the cover body 2 is not caused to open.

When the cover body 2 is intentionally opened, firstly the cover body 2 closed is pressed down, and then the unlocking button 110 is pressed down. Pressing down the cover body 2 moves the locking pin 114 lower than the recess 119 to come out thereof (FIG. 6D). Next, in this condition (with the cover body 2 pressed down) the unlocking button 110 is pressed down, and then unlocking lever 121 comes into contact with the upper part of the inclined surface 130 to press down the same. Then the lock piece 115 is swung again in the direction of the arrow A (FIG. 6E). When the lock pawl 116 comes off the lock pin 114, the cover body 3 becomes ready to be opened. Thus, the engagement between the engagement recess 119 and the lock pin 114 effectively prevents the unintentional opening of the cover body 2.

Figure 7A:
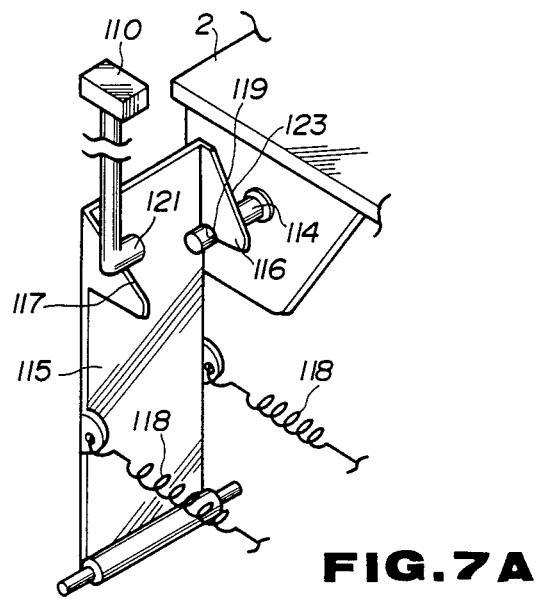
FIGS. 7A-7D are perspective views of other embodiments of the cover body closing device.

Next, other embodiments of the cover body closing device will be explained with reference to FIG. 7. In the embodiments of FIGS. 7A, B and C, the inclined surface for guiding the lock pin 114, and the inclined surface for guiding the unlocking lever 121 are respectively formed at different positions as a guide surface 123 and a slide surface 117.

In the embodiment of FIG. 7A, the lock piece 115 is made of a tangular plate. The guide surface 123 and the slide surface 117 are formed on the upper ends of the right and the left sides of the tangular lock piece 115.

Figure 7B:
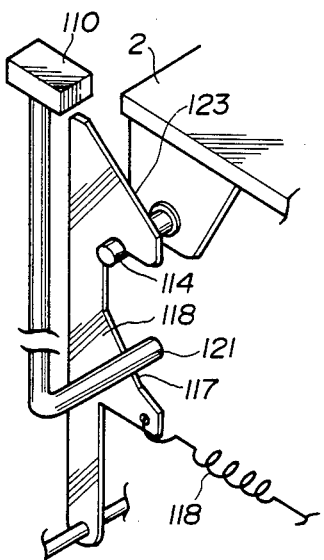

In the embodiment of FIG. 7B, the guide surface 123 and the slide surface 117 are formed in the lock piece 115 respectively in an upper and a lower stages.

Figure 7C:
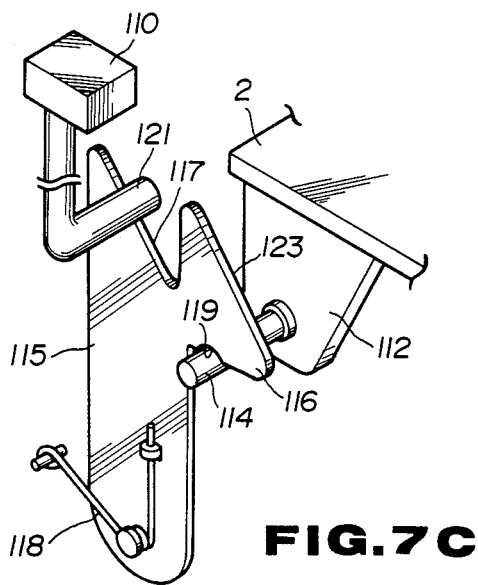

In the embodiment of FIG. 7C, the guide surface 123 and the slide surface 117 are formed in the lock piece 115 respectively in a front and a back stages.

Figure 7D:
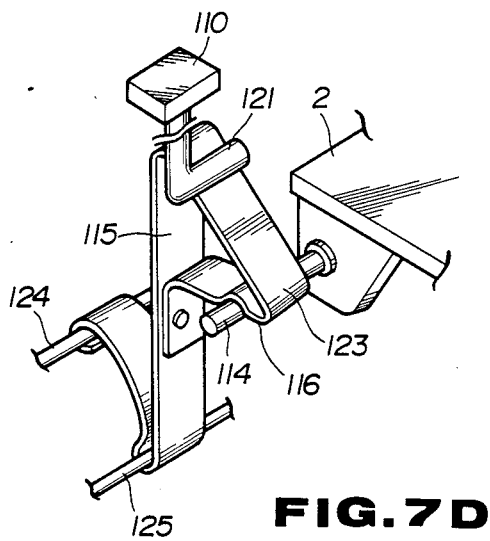
Figure 8:
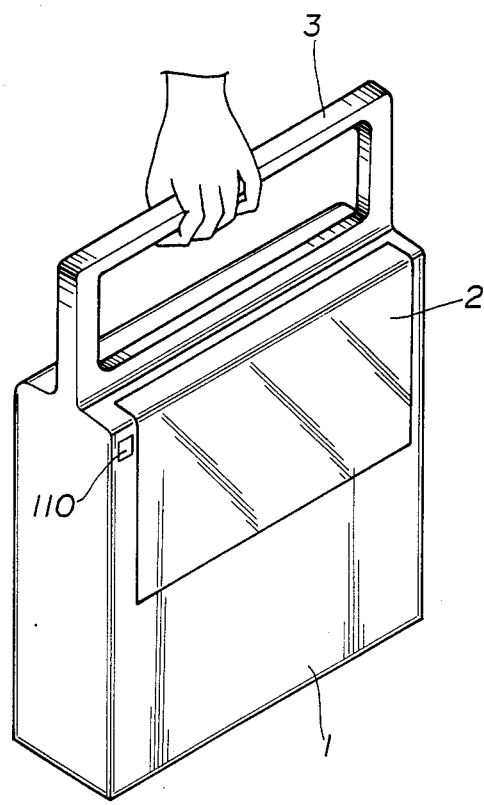
FIG. 8 is perspective views of the device for the prior art portable facsimile equipment.

In the embodiment of FIG. 7D, the lock piece 115 is curved. The lower end portion of the curved lock piece 115 is put around two shafts 124, 125 provided on the main body, which allows the lock piece 115 as a whole to function as a leaf spring. This embodiment can dispense with the return spring. This makes the structure of the device simpler, and the device of this structure occupies less space.

The lock pin 114 may have a rotatable roller on its axis. And the unlocking lever 121 may have a rotatable roller at its end.

What is claimed:

1. A portable facsimile equipment, which has a main body, and a cover body having one end connected pivotally to one end of said main body swingably in its opening direction, said equipment comprising:
   a cover body having a reading head for reading an original and a printing head for printing on recording paper disposed on the inside thereof;
   a main body having a reading roller for guiding said original opposed to said reading head, a printing roller for supplying said recording paper opposed to said printing head and a roll body having said recording paper wound on and respective driving means for rotating said reading roller and said printing roller disposed therein, and having said cover body pivotally connected thereto; and
   said reading head having a front surface made flat and smooth for guiding said original between said front surface thereof and said reading roller, said printing head having a front surface made flat and smooth for guiding said recording paper between said front surface and said printing roller.

2. A portable facsimile equipment comprising:
   a main body provided with a handle;

a cover body having the end on the opposite side of said handle pivotally connected to said main body so that the end on the side of said handle may open;

a reading head for reading an original, disposed on the inside of said cover body on the side of said handle;

a printing head for printing on recording paper, disposed on the inside of said cover body on the side of said pivotal connection;

a reading roller for guiding said original disposed in said main body, opposed to said reading head;

a printing roller for guiding out said recording paper disposed in said main body, opposed to said printing head;

a roll body having said recording paper wound on, disposed rotatably between said reading roller and said printing roller;

an original inlet formed in said cover body, and an original outlet formed between said cover body and the end surface of said main body on the side of said handle in a communicative relationship with said inlet; and a recording paper outlet for guiding out the recording paper supplied by said roll body, formed between said cover body and the pivitally connected and surface of said main body.

3. A portable facsimile equipment according to claim 2, wherein the core of said roll body is inserted rotatably in a recess of a support bracket attached to said main body.

4. A cover body closing device comprising:

a lock piece disposed between said main body and said cover body, supported on said main body swingably around supporting axis; a lock pin projected from one side of said cover body and engageable with said lock piece; urging means for urging said lock piece; and locking means for using the urging force of said urging means to bring said lock piece into engagement with said lock pin when said cover body is pressed down, thereby to lock said cover body in its closing position;

unlocking means for swinging said lock piece in the direction opposite to that of urging of said urging means so as to disengage said lock piece from said lock pin; and an engagement recess formed in said lock piece into which said lock pin engages, and from which said lock pin is disengaged by a pressing down force applied to said cover body in its locked condition.

5. A cover body closing device according to claim 4, wherein said lock piece has a guide surface for guiding said lock pin and a slide surface for sliding said unlocking means.

6. A cover body closing device according to claim 5, wherein said lock piece is made of a tangular plate, of which a guide surface is formed on the right upper ends, of which a slide surface is formed on the left upper ends.

7. A cover body closing device according to claim 5, wherein said guide surface and said slide surface are formed in said lock piece respectively in an upper and a lower stages in perpendicular direction of said supporting axis.

8. A cover body closing device according to claim 5, wherein said guide surface and said slide surface are formed in said lock piece respectively in a left and a right stages in perpendicular direction of said supporting axis.

9. A cover body closing device according to claim 5, wherein said lock piece is curved and put around two shafts provided on said main body, which allows the lock piece as a whole to function as a leaf spring.

10. A cover body closing device according to claim 4, wherein said lock pin has a roller.

11. A cover body closing device according to claim 4, wherein said unlocking means is a lever having a roller of its tip end.

12. A portable facsimile device which has a cover body closing device comprising:

a lock piece disposed between said main body and said cover body supported on said main body swingably around supporting axis;

a lock pin projected from one side of said cover body and engageable with said lock piece;

urging means for urging said lock piece;

and locking means for using the urging force of said urging means to bring said lock piece into engagement with said lock pin when said cover body is pressed down, thereby locking said cover body in its closing position;

unlocking means for swinging said lock piece in the direction opposite to that of urging of said urging means so as to disengage said lock piece from said lock pin; and an engagement recess formed in said lock piece into which said lock pin engages, and from which said lock pin in disengaged by a depression force applied to said cover body in its locked condition.

13. The portable facsimile device according to claim 12, wherein said lock piece has a guide surface for guiding said lock pin and a slide surface for sliding said unlocking means.

14. The portable facsimile device according to claim 13, wherein said lock piece is made of tangular plate, of which a guide surface is formed on the right upper ends. of which a slide surface is formed on the left upper ends.

15. The portable facsimile device according to claim 13, wherein said guide surface and said slide surface are formed in said lock piece respectively in upper and lower stages in the perpendicular direction of said supporting axis.

16. The portable facsimile device according to claim 13, wherein said guide surface and said slide surface are formed in said lock piece respectively in left end and right stages in the perpendicular direction of said supporting axis.

17. The portable facsimile device according to claim 13, wherein said lock piece is curved and disposed around two shafts provided on said main body, which allows the lock piece as a whole to function as a leaf spring.

18. The portable facsimile device according to claim 12, wherein said lock pin has a roller.

19. The portable facsimile device according to claim 12, wherein said unlocking means is a lever having a roller at its tip end.

* * * * *